US012288942B2

(12) United States Patent
Takagi et al.

(10) Patent No.: US 12,288,942 B2
(45) Date of Patent: Apr. 29, 2025

(54) ELECTRIC CONNECTOR

(71) Applicant: HIROSE ELECTRIC CO., LTD., Kanagawa (JP)

(72) Inventors: Yuta Takagi, Kanagawa (JP); Shota Hironaka, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 361 days.

(21) Appl. No.: 18/100,865

(22) Filed: Jan. 24, 2023

(65) Prior Publication Data

US 2023/0246375 A1 Aug. 3, 2023

(30) Foreign Application Priority Data

Feb. 1, 2022 (JP) ................................. 2022-014301

(51) Int. Cl.

*H01R 13/40* (2006.01)
*H01R 12/55* (2011.01)
*H01R 12/71* (2011.01)
*H01R 13/405* (2006.01)
*H01R 13/502* (2006.01)

(52) U.S. Cl.

CPC ........... *H01R 13/405* (2013.01); *H01R 12/55* (2013.01); *H01R 12/716* (2013.01); *H01R 13/502* (2013.01)

(58) Field of Classification Search

CPC ....... H01R 12/00; H01R 12/52; H01R 12/716
USPC .................................................... 439/74, 660
See application file for complete search history.

(56) References Cited

U.S. PATENT DOCUMENTS

| | | | | |
|---|---|---|---|---|
| 12,160,063 | B2 * | 12/2024 | Tanaka | H01R 12/73 |
| 2016/0315430 | A1 * | 10/2016 | Takeuchi | H01R 12/707 |
| 2020/0358213 | A1 | 11/2020 | Tanaka et al. | |

FOREIGN PATENT DOCUMENTS

| | | | |
|---|---|---|---|
| JP | 2020-184459 | A | 11/2020 |

* cited by examiner

*Primary Examiner* — Phuong K Dinh
(74) *Attorney, Agent, or Firm* — RANKIN, HILL & CLARK LLP

(57) ABSTRACT

Provided is an electric connector which includes: a housing; and a pair of reinforcement brackets reinforces both end sides of the housing in a longitudinal direction, wherein the housing has a bottom wall, a pair of short walls, a pair of long walls, an island-shaped protruding wall surrounded by the short walls and the long walls, and pairs of corner portions between a corresponding pair of short and long walls, each reinforcement bracket has an outer plate portion, a short wall protection portion, a pair of side plate portions, a pair of long wall protection portions, a pair of connection portions connecting the outer plate portion to the side plate portions, and a pair of corner protection portions, and each corner protection portion extends from either one of the outer plate portion or the side plate portions, and is formed to cover an upper surface of the corner portions.

10 Claims, 12 Drawing Sheets

ELECTRIC CONNECTOR

CROSS-REFERENCE TO RELATED APPLICATION

This application claims priority from Japanese Patent Application No. 2022-014301 filed with the Japan Patent Office on Feb. 1, 2022, the entire content of which is hereby incorporated by reference.

BACKGROUND

1. Technical Field

The present disclosure relates to an electric connector.

2. Related Art

As an electric connector to be mounted on, e.g., a circuit board, an electric connector of which the robustness is enhanced in such a manner that reinforcement brackets are embedded in a resin housing has been known (see, e.g., JP-A-2020-184459). The housing of the electric connector described in JP-A-2020-184459 has a bottom wall having a rectangular shape as viewed in plane, a pair of short walls and a pair of long walls standing on four sides of the bottom wall, and an island-shaped protruding wall provided inside the pair of short walls and the pair of long walls. The reinforcement brackets are each embedded on both end side of the housing in a longitudinal direction thereof, and each reinforcement bracket reinforces the short wall and a corresponding one of end sides of the long walls in the longitudinal direction. Thus, the robustness of the electric connector is ensured.

This reinforcement bracket is formed in such a manner that a single metal plate punched into a predetermined shape is bent. An outer plate portion which is a base of the reinforcement bracket is provided in the short wall of the housing, and an upper plate portion extends from an upper edge of the outer plate portion so as to cover an upper surface of the short wall. A pair of side plate portions continuous to both side edges of the outer plate portion are embedded in the pair of long walls of the housing, and a pair of upper plate portions extends from upper edges of the pair of side plate portions so as to cover upper surfaces of the long walls. The upper surfaces of the short and long walls are partially covered with each upper plate portion of the reinforcement bracket, and the resin short and long walls are protected by the reinforcement bracket.

SUMMARY

An electric connector according to an embodiment of the present disclosure includes: a housing configured such that a plurality of signal terminals is arrayed and having a rectangular shape as viewed in plane; and a pair of reinforcement brackets that reinforces both end sides of the housing in a longitudinal direction, in which the housing has a bottom wall having a rectangular shape as viewed in plane, a pair of short walls standing on both ends of the bottom wall in the longitudinal direction, a pair of long walls standing on both ends of the bottom wall in a lateral direction, an island-shaped protruding wall surrounded by the pair of short walls and the pair of long walls, and pairs of corner portions each of which is formed between a corresponding pair of short and long walls, each reinforcement bracket has an outer plate portion along an outer surface of a corresponding one of the short walls, a short wall protection portion extending from the outer plate portion so as to cover an upper surface of the corresponding one of the short walls, a pair of side plate portions along outer surfaces of the pair of long walls, a pair of long wall protection portions extending from the pair of side plate portions so as to cover upper surfaces of the pair of long walls, a pair of connection portions connecting both side edges of the outer plate portion to side edges of the pair of side plate portions, and a pair of corner protection portions, and each corner protection portion extends from either one of the outer plate portion or a corresponding one of the side plate portions, and is formed so as to cover an upper surface of a corresponding one of the corner portions.

DETAILED DESCRIPTION

Figure 1:
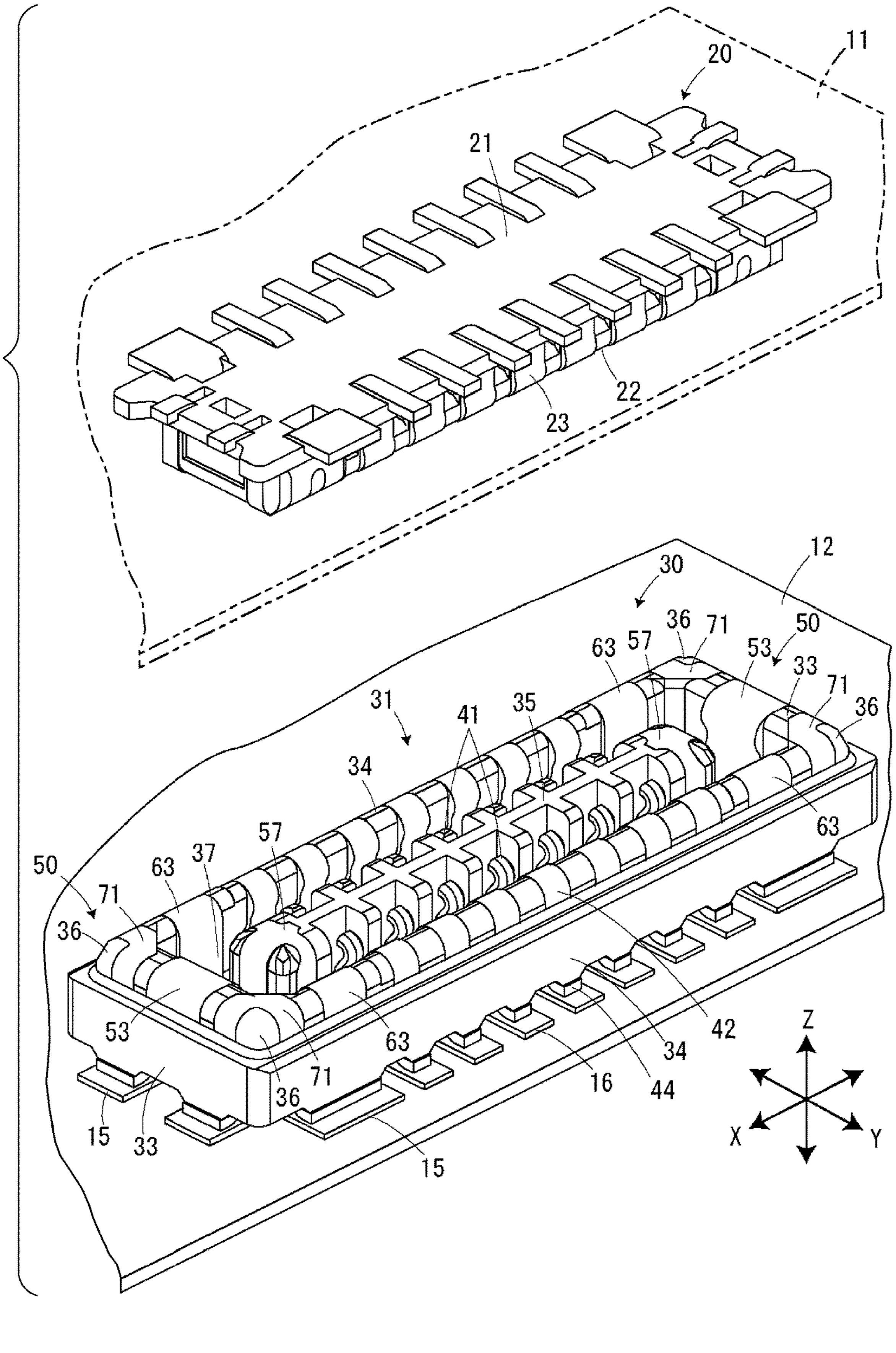
FIG. 1 is a perspective view of a receptacle connector of a first embodiment and a plug connector.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the electric connector described in JP-A-2020-184459, the short wall and the pair of long walls are covered from above with the upper plate portions of each reinforcement bracket. However, each corner portion of the housing between the short wall and the long wall is not covered with the upper plate portion of the reinforcement bracket. For this reason, there is a probability that the corner portion of the housing is damaged if the positions of the connectors are displaced from each other in fitting.

The present disclosure has been made in view of the above-described problem, and one object of the present disclosure is to provide an electric connector capable of ensuring a high robustness in fitting.

An electric connector according to an aspect of the present disclosure includes: a housing configured such that a plurality of signal terminals is arrayed and having a rectangular shape as viewed in plane; and a pair of reinforcement brackets that reinforces both end sides of the housing in a longitudinal direction, in which the housing has a bottom wall having a rectangular shape as viewed in plane, a pair of short walls standing on both ends of the bottom wall in the longitudinal direction, a pair of long walls standing on both ends of the bottom wall in a lateral direction, an island-shaped protruding wall surrounded by the pair of short walls and the pair of long walls, and pairs of corner portions each of which is formed between a corresponding pair of short and long walls, each reinforcement bracket has an outer plate portion along an outer surface of a corresponding one of the short walls, a short wall protection portion extending from the outer plate portion so as to cover an upper surface of the corresponding one of the short walls, a pair of side plate portions along outer surfaces of the pair of long walls, a pair of long wall protection portions extending from the pair of side plate portions so as to cover upper surfaces of the pair of long walls, a pair of connection portions connecting both side edges of the outer plate portion to side edges of the pair of side plate portions, and a pair of corner protection portions, and each corner protection portion extends from either one of the outer plate portion or a corresponding one of the side plate portions, and is formed so as to cover an upper surface of a corresponding one of the corner portions.

In the electric connector of one aspect of the present disclosure, the upper surface of the short wall of the housing is covered with the short wall protection portion extending from the outer plate portion of the reinforcement bracket, and the upper surfaces of the pair of long walls of the housing are covered with the pair of long wall protection portions extending from the pair of side plate portions of the reinforcement bracket. The upper surfaces of the corner portions of the housing are covered with the pair of corner protection portions extending from either one of the outer plate portion or the pair of side plate portions. Thus, even if the pair of connection portions connecting the outer plate portion and the pair of side plate portions to each other is not exposed on the upper surfaces of the corner portions of the housing, the corner portions of the housing can be protected by the pair of corner protection portions. Even if the connectors contact each other in fitting, the short walls, the long walls, and the corner portions of the housing are protected from a load in a fitting direction, and therefore, the robustness of the electric connector is enhanced.

First Embodiment

Hereinafter, a receptacle connector of a first embodiment will be described. FIG. 1 is a perspective view of the receptacle connector of the first embodiment and a plug connector which is a partner connector. Note that for the sake of convenience in description, a plug connector-side circuit board is indicated by a chain double-dashed line in FIG. 1. Moreover, in description below, a circuit board side will be described as a lower side, and the opposite side thereof will be described as an upper side. Further, fitting between the receptacle connector and the plug connector will be sometimes merely referred to as fitting.

As shown in FIG. 1, the receptacle connector (an electric connector) 30 of the present embodiment and the plug connector (a partner electric connector) 20 are so-called board-to-board (B-to-B) connectors electrically connecting the circuit boards 11, 12 to each other. A plurality of mounting pads (not shown) is provided on a surface (a lower surface as viewed in FIG. 1) of one circuit board 11, and the plug connector 20 is fixed to each mounting pad. Similarly, a plurality of mounting pads (mounting surfaces) 15, 16 is provided on a surface of the other circuit board 12, and the receptacle connector 30 is fixed to each mounting pad 15, 16. Note that the circuit boards 11, 12 include, for example, printed boards and flexible boards.

A rectangular annular fitting portion 22 is formed at a resin housing 21 of the plug connector 20. A rectangular annular receiving space 37 that receives the fitting portion 22 of the plug connector 20 is formed at a resin housing 31 of the receptacle connector 30. The fitting portion 22 of the plug connector 20 enters the receiving space 37 of the receptacle connector 30, and accordingly, each signal terminal 23 of the plug connector 20 exposed to the outside of the fitting portion 22 contacts a corresponding one of signal terminals 41 of the receptacle connector 30 in the receiving space 37. Accordingly, the circuit boards 11, 12 are electrically connected to each other through the plug connector 20 and the receptacle connector 30.

In such connection between the circuit boards 11, 12, the plug connector 20 is hidden behind one circuit board 11 (see FIG. 1), and for this reason, it is difficult to align the position of the plug connector 20 with the position of the receptacle connector 30 on the other circuit board 12. If the plug connector 20 is pushed into the receptacle connector 30 with the position of the plug connector 20 displaced relative to the position of the receptacle connector 30, there is a probability that the housing 31 of the receptacle connector 30 is damaged due to a load acting on the housing 31 in a fitting direction Z. Particularly in recent years, there has been a demand for connector size reduction accompanied by size and weight reduction in electronic equipment, and there is a disadvantage that a small connector is likely to be broken due to erroneous attachment.

For these reasons, a pair of reinforcement brackets 50 is provided on both sides of the resin housing 31 in a longitudinal direction X in the housing 31 of the receptacle connector 30 of the present embodiment. A short wall protection portion 53 of the reinforcement bracket 50 is exposed on an upper surface of a short wall 33 of the housing 31, a pair of long wall protection portions 63 of the reinforcement bracket 50 is exposed on upper surfaces of a pair of long walls 34 of the housing 31, and a pair of corner protection portions 71 is exposed on upper surfaces of a pair of corner portions 36 of the housing 31. The short walls 33, the long walls 34, and the corner portions 36 of the housing 31 are protected by the short wall protection portions 53, the pairs of long wall protection portions 63, and the pairs of corner protection portions 71, and therefore, the robustness of the receptacle connector 30 is ensured.

Figure 2:
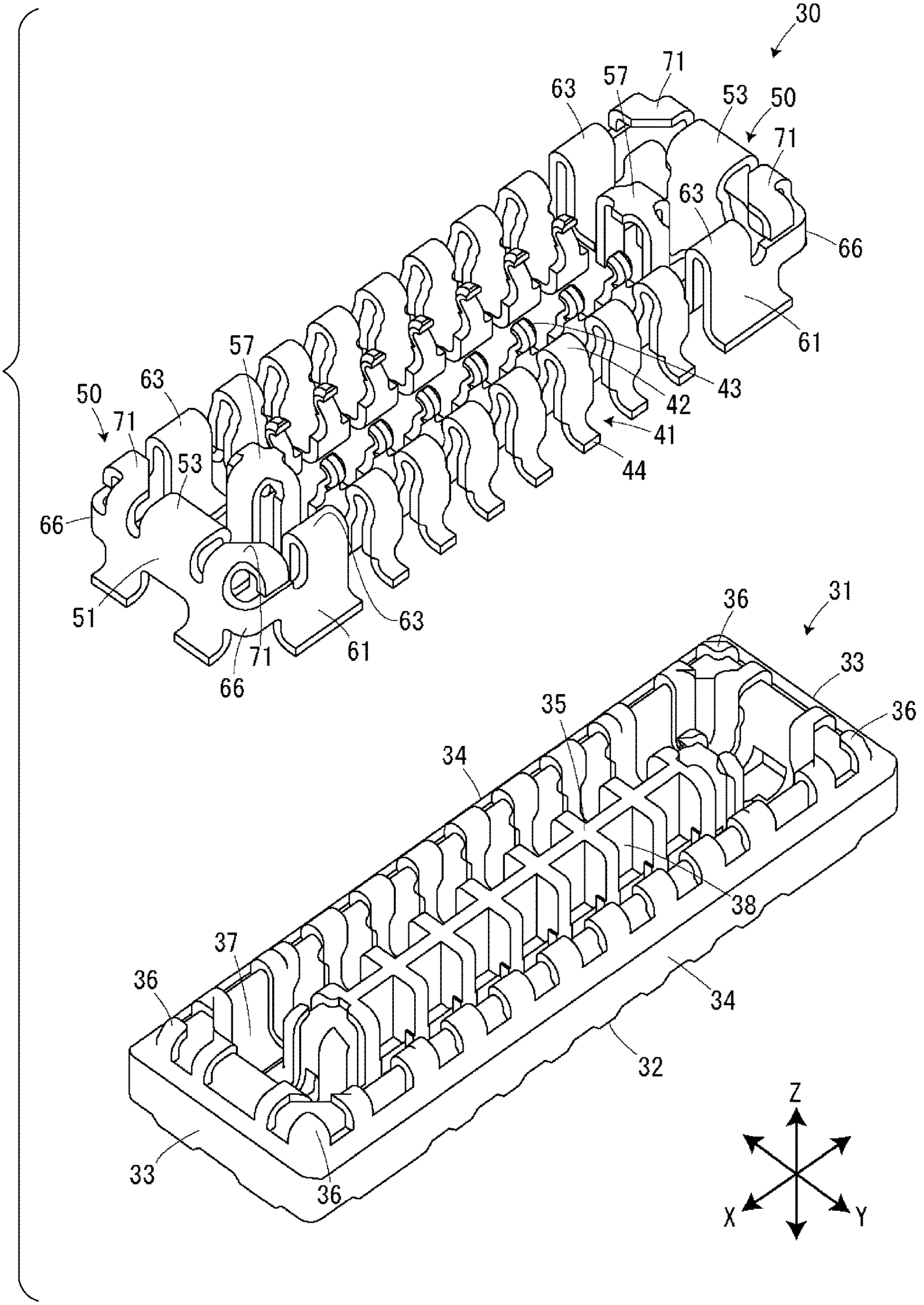
FIG. 2 is an exploded perspective view of the receptacle connector according to the first embodiment.
Figure 3A:
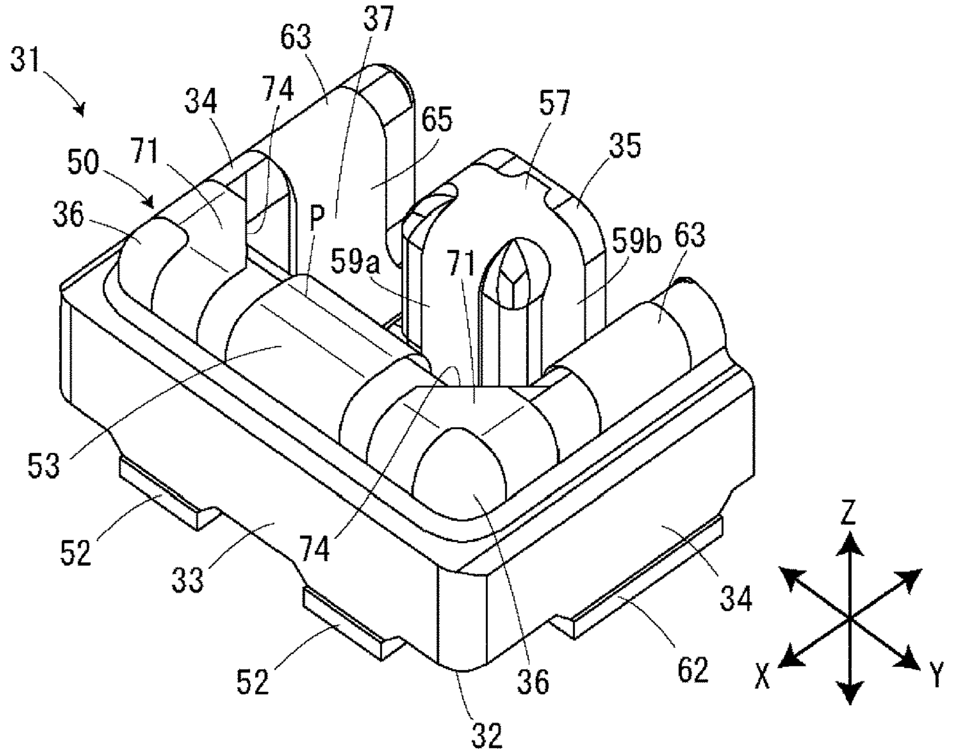
FIGS. 3A and 3B are perspective views of an end portion of the receptacle connector according to the first embodiment.
Figure 3B:
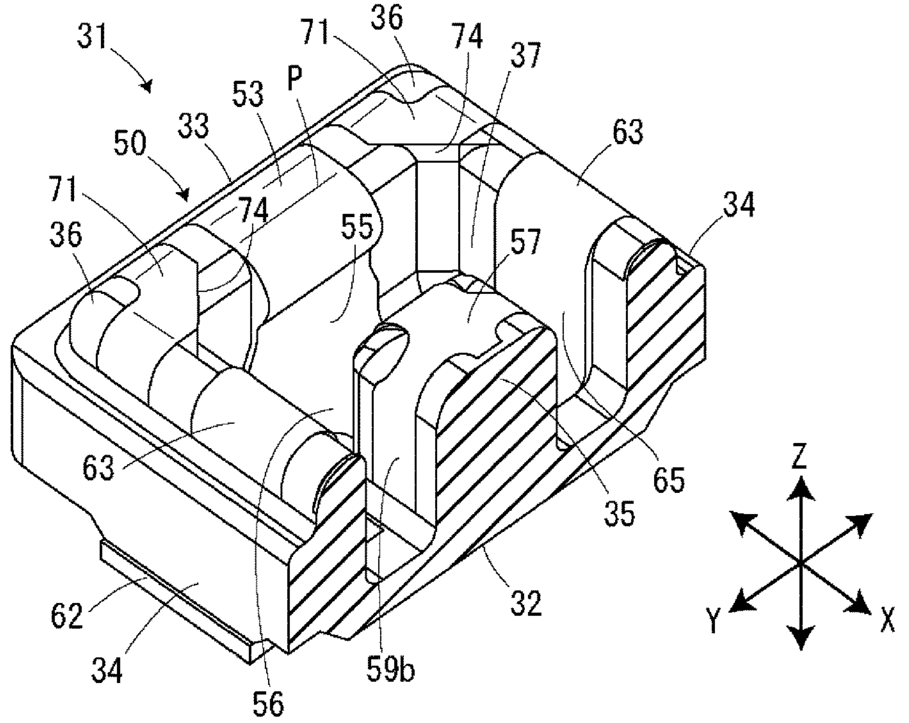
Figure 4A:
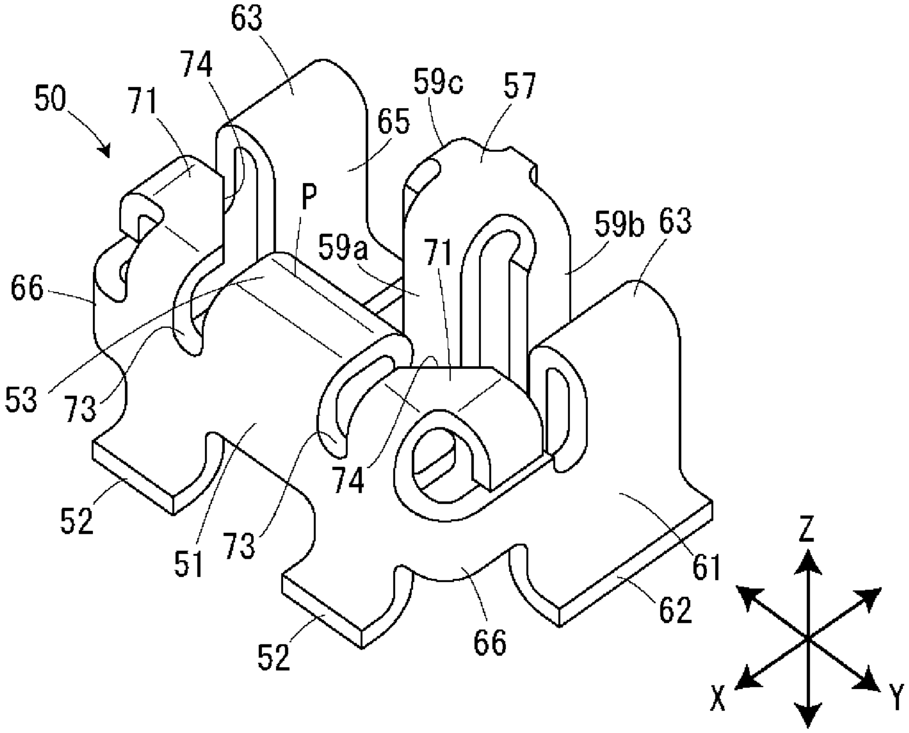
FIGS. 4A and 4B are perspective views of a reinforcement bracket according to the first embodiment.
Figure 4B:
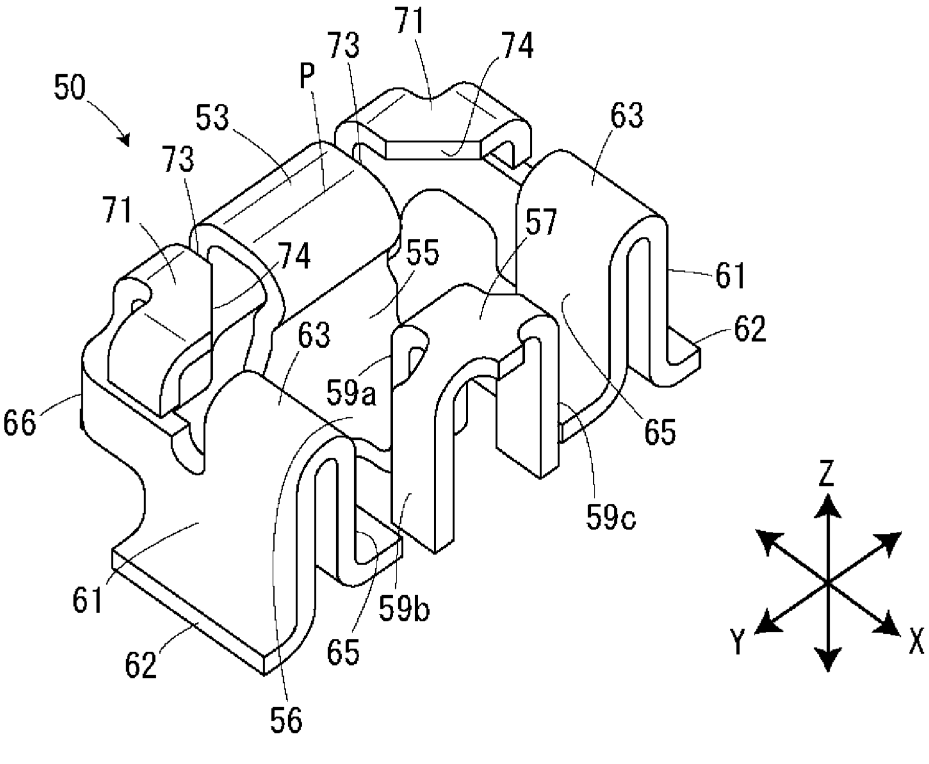

Details of the receptacle connector 30 will be described with reference to FIGS. 2 to 4. FIG. 2 is an exploded perspective view of the receptacle connector 30 of the first embodiment. FIGS. 3A and 3B are perspective views of an end portion of the receptacle connector 30 of the first embodiment. FIGS. 4A and 4B are perspective views of the reinforcement bracket of the first embodiment. Note that FIG. 3A is the perspective view of the end portion of the receptacle connector 30 from the outside and FIG. 3B is the perspective view of the end portion of the receptacle connector from the inside. FIG. 4A is the perspective view of the reinforcement bracket from the outside, and FIG. 4B is the perspective view of the reinforcement bracket from the inside.

As shown in FIG. 2, the receptacle connector 30 is configured such that the plurality of signal terminals 41 and the pair of reinforcement brackets 50 are embedded in the resin housing 31. The housing 31 has a bottom wall 32 having a rectangular shape as viewed in plane, the pair of short walls 33 standing on both ends of the bottom wall 32 in the longitudinal direction X, the pair of long walls 34 standing on both ends of the bottom wall 32 in a lateral direction Y, and an island-shaped protruding wall 35 surrounded by the pair of short walls 33 and the pair of long walls 34. In the housing 31, the rectangular annular receiving space 37 that receives the rectangular annular fitting portion 22 (see FIG. 1) of the plug connector 20 by the pair of short walls 33, the pair of long walls 34, and the island-shaped protruding wall 35 is formed. Each corner portion 36 is formed between the short wall 33 and the long wall 34 at a corresponding one of four corners of the housing 31. The corner portions 36 each extend inward of the housing 31 from the four corners of the housing 31.

The plurality of signal terminals 41 and the pair of reinforcement brackets 50 are integrated with the housing 31 by insert molding. In this case, the receptacle connector 30 is molded in such a manner that molten resin is injected into a die in which the plurality of signal terminals 41 and the pair of reinforcement brackets 50 are placed. Thus, the plurality of signal terminals 41 and the pair of reinforcement brackets 50 are not separated from the housing 31, but for the sake of convenience in description, FIG. 2 shows a state in which the plurality of signal terminals 41 and the pair of reinforcement brackets 50 are separated from the housing 31. Note that the receptacle connector 30 may be formed in such a manner that the plurality of signal terminals 41 and the pair of reinforcement brackets 50 are press-fitted in the housing 31.

The plurality of signal terminals 41 is arrayed in the pair of long walls 34 of the housing 31. The signal terminal 41 is formed in such a manner that a metal piece is bent. The signal terminal 41 has a terminal curved portion 42 in the form of a U-shaped plate along an outer surface of the long wall 34, a contact spring 43 extending from one end of the terminal curved portion 42 toward the protruding wall 35, and a terminal mounting portion 44 protruding outward of the long wall 34 from the other end of the terminal curved portion 42. The contact spring 43 is housed with standing in a housing groove 38 which is formed in such a manner that an outer surface of the protruding wall 35 is cut out, and an inner space of the housing groove 38 allows deflection of the contact spring 43 in a plate thickness direction (the lateral direction Y of the housing 31) thereof.

A portion between the terminal mounting portion 44 and the terminal curved portion 42 of the signal terminal 41 is embedded in the long wall 34 (see FIG. 1). Thus, in soldering of the terminal mounting portion 44 of the receptacle connector 30, the flow of molten solder along a surface of the terminal mounting portion 44 is blocked by the outer surface of the long wall 34. That is, the molten solder is held back by the insulating resin, which has a low solderability, of the long wall 34, and therefore, so-called solder wicking causing an upward solder flow along the surface of the terminal mounting portion 44 is reduced. The terminal mounting portions 44 of the signal terminals 41 are soldered to the mounting pads 16 of the circuit board 12 (see FIG. 1), and accordingly, the receptacle connector 30 is electrically connected to a signal processing circuit of the circuit board 12.

The pair of reinforcement brackets 50 is provided on both sides of the housing 31 in the longitudinal direction X. The reinforcement bracket 50 is formed in such a manner that a metal plate punched into a predetermined shape is bent. In order to protect an upper surface of the housing 31, the reinforcement bracket 50 includes the short wall protection portion 53, the pair of long wall protection portions 63, the pair of corner protection portions 71, and a protruding wall protection portion 57. The upper surface of the short wall 33 of the housing 31 is protected by the short wall protection portion 53. Upper surfaces of end portions of the pair of long walls 34 of the housing 31 in the longitudinal direction X are protected by the pair of long wall protection portions 63. The upper surfaces of the pair of corner portions 36 of the housing 31 are protected by the pair of corner protection portions 71. An upper surface of an end portion of the island-shaped protruding wall 35 of the housing 31 in the longitudinal direction X is protected by the protruding wall protection portion 57.

As shown in FIGS. 3A, 3B, 4A, and 4B, an outer plate portion 51 of the reinforcement bracket 50 which is a base of the reinforcement bracket 50 is provided in the short wall 33 of the housing 31. The outer plate portion 51 extends, in the short wall 33, in the lateral direction Y of the housing 31 along an outer surface of the short wall 33. The short wall protection portion 53 extends from an upper edge of the outer plate portion 51 so as to cover the upper surface of the short wall 33 of the housing 31. The short wall protection portion 53 is curved in an inverted U-shape as viewed in section, and a top surface of the short wall protection portion 53 protects the short wall 33 from contact with the plug connector 20 (see FIG. 1). An inner plate portion 55 extends from the short wall protection portion 53 along an inner surface of the short wall 33 of the housing 31, and the short wall protection portion 53 and the inner plate portion 55 form a guide at each end in the longitudinal direction X in fitting of the plug connector 20.

A bottom plate portion 56 extends from a lower edge of the inner plate portion 55 of the reinforcement bracket 50 along a bottom surface of the bottom wall 32 of the housing 31, and the protruding wall protection portion 57 extends from the bottom plate portion 56 so as to cover the end portion of the protruding wall 35. The protruding wall protection portion 57 is branched substantially in a T-shape on the upper surface of the protruding wall 35, and a top surface of the protruding wall protection portion 57 protects the protruding wall 35 from contact with the plug connector 20. The protruding wall protection portion 57 has a branch portion 59_a_, a branch portion 59_b_, and a branch portion 59_c_ branched substantially in the T-shape as viewed in plane. The branch portion 59_a_ of the protruding wall protection portion 57 is continuous to the bottom plate portion 56, and the pair of branch portions 59_b_, 59_c_ of the protruding wall protection portion 57 faces each other with the protruding wall 35 interposed therebetween. Tip ends of the pair of branch portions 59_b_, 59_c_ are embedded in the bottom wall 32 of the housing 31. With this configuration, a strength against the load in the fitting direction Z is enhanced, and sinking of the protruding wall protection portion 57 is reduced.

A pair of side plate portions 61 of the reinforcement bracket 50 is provided in the pair of long walls 34 of the housing 31. The pair of side plate portions 61 extends, in the pair of long walls 34, in the longitudinal direction X of the housing 31 along the outer surfaces of the long walls 34. From upper edges of the pair of side plate portions 61, the pair of long wall protection portions 63 extends so as to cover the upper surfaces of the pair of long walls 34. Each long wall protection portion 63 is curved in an inverted U-shape as viewed in section, and a top surface of each long wall protection portion 63 protects a corresponding one of the long walls 34 from contact with the plug connector 20. A leg portion 65 extends from each long wall protection portion 63 along an inner surface of a corresponding one of the long walls 34, and the long wall protection portion 63 and the leg portion 65 form a guide at each end in the lateral direction Y in fitting of the plug connector 20.

A lower edge of the outer plate portion 51 is bent outward to form a pair of outer plate mounting portions 52. Lower edges of the pair of side plate portions 61 are bent outward to form a pair of side plate mounting portions 62. The pair of outer plate mounting portions 52 and the pair of side plate mounting portions 62 are soldered to the mounting pad 15 of the circuit board 12 (see FIG. 1). A portion of the reinforcement bracket 50 between the short wall protection portion 53 and each outer plate mounting portion 52 is embedded in the short wall 33 of the housing 31, and each portion of the reinforcement bracket 50 between the long wall protection portion 63 and the side plate mounting portion 62 is embedded in a corresponding one of the long walls 34 of the housing 31. Thus, in soldering of the pair of outer plate mounting portions 52 and the pair of side plate mounting portions 62, the molten solder is held back by the resin short wall 33 and the pair of resin long walls 34, and the solder wicking is reduced accordingly.

The reinforcement bracket 50 has a pair of connection portions 66. Both side edges of the outer plate portion 51 and side edges of the pair of side plate portions 61 are coupled to each other through the pair of connection portions 66. Each connection portion 66 is provided in a corresponding one of the corner portions 36, each of which is formed between the short wall 33 and the long wall 34, and is not exposed on the upper surface of the corresponding one of the corner portions 36. That is, the pair of connection portions 66 does not cover the upper surfaces of the pair of corner portions 36. Thus, in order to protect the corner portions 36 of the housing 31, the pair of corner protection portions 71 extends from the upper edge of the outer plate portion 51 so as to cover the upper surfaces of the pair of corner portions 36. The pair of corner protection portions 71 extends downward to the side plate portions 61 after having diagonally extended over the upper surfaces of the corner portions 36 of the housing 31 from the upper edge of the outer plate portion 51. That is, top surfaces of the pair of corner protection portions 71 protect the corner portions 36 of the housing 31 from contact with the plug connector 20.

More specifically, the corner protection portion 71 extends from an upper edge of an end portion of the outer plate portion 51 on one side of the connection portion 66 toward an upper edge of an end portion of the side plate portion 61 on the other side of the connection portion 66. A tip end of the protruding corner protection portion 71 is separated from the upper edge of the end portion of the side plate portion 61 with a slight clearance formed therebetween. The resin of the long wall 34 enters to fill such a clearance (specifically see FIG. 5C). The tip end of the corner protection portion 71 is embedded in the long wall 34 as described above, and accordingly, the strength against the load in the fitting direction Z is enhanced and sinking of the corner protection portion 71 is reduced. As described above, the corner portion 36 of the housing 31 is protected by the corner protection portion 71 extending from the upper edge of the outer plate portion 51 so as to bypass the connection portion 66.

A slit 73 is formed between each corner protection portion 71 and the short wall protection portion 53 at the reinforcement bracket 50, and the resin of the short wall 33 enters to fill such a slit 73. Since each corner protection portion 71 and the short wall protection portion 53 are separated from each other with the slit 73 formed therebetween, the shape of the short wall protection portion 53 is not influenced by the shape of the corner protection portion 71. Thus, in the longitudinal direction X of the housing 31, the width of the top surface of the corner protection portion 71 and the width of the top surface of the short wall protection portion 53 do not need to be the same as each other. Moreover, a bending position P between the short wall protection portion 53 and the inner plate portion 55 can be closer to the outside in the longitudinal direction X of the housing 31. With this configuration, the short wall 33 can be formed thinner, and the receptacle connector 30 can be reduced in size.

The top surfaces of the pair of corner protection portions 71 are diagonally cut out as viewed in plane, and the sections 74, which are cut surfaces, of the pair of corner protection portions 71 are exposed to the inside of the housing 31. Specifically, the pair of corner protection portions 71 has, at the surfaces covering the upper surfaces of the corner portions 36, cutouts diagonally formed as viewed in plane. The sections 74 which are cut surfaces of these cutouts face the protruding wall 35 of the housing 31, and are exposed to the inside of the housing 31. The sections 74 are exposed to the inside of the housing 31 without covered with the resin by insert molding, and therefore, a predetermined resin thickness required for insert molding can be decreased. Thus, insert molding can be facilitated. Note that in fitting, the short wall protection portions 53 and the long wall protection portions 63 contact the fitting portion 22 of the plug connector 20, and accordingly, the fitting portion 22 is guided into the receiving space 37. Thus, even if the sections 74 of the corner protection portions 71 are exposed to the inside of the housing 31, the sections 74 and the fitting portion 22 of the plug connector 20 are less likely to contact each other.

Figure 5A:
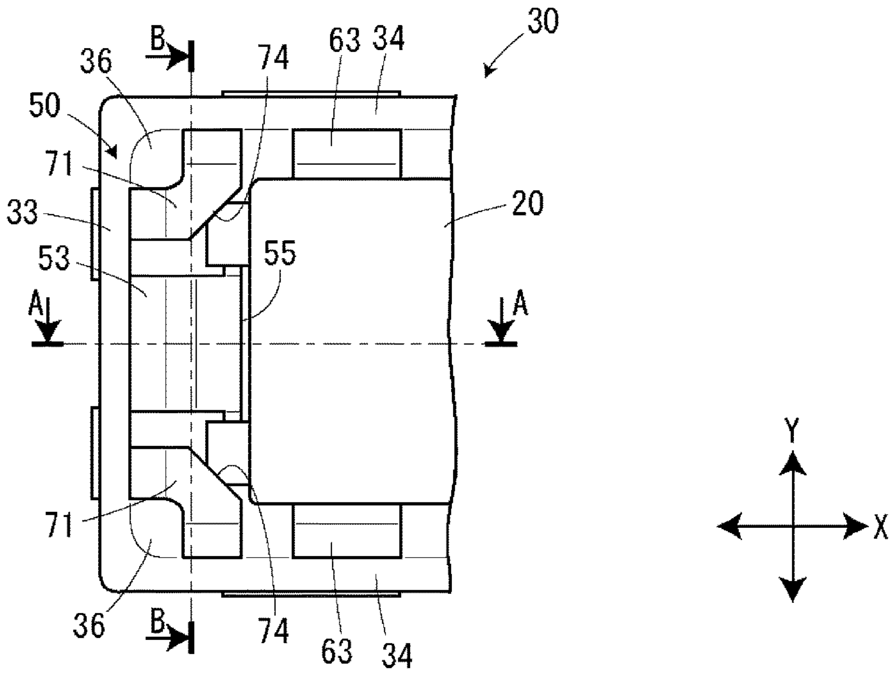
FIGS. 5A to 5C are views for describing an operation of fitting the receptacle connector and the plug connector to each other according to the first embodiment.
Figure 5B:
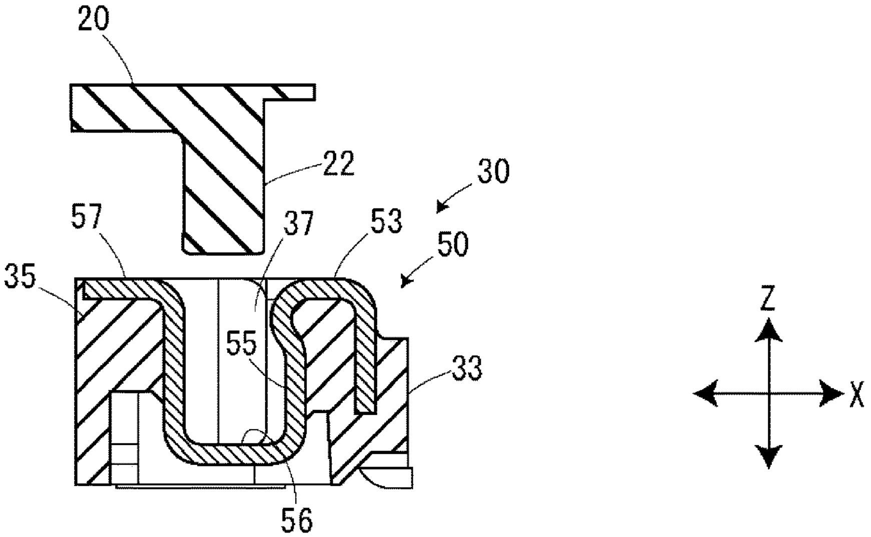
Figure 5C:
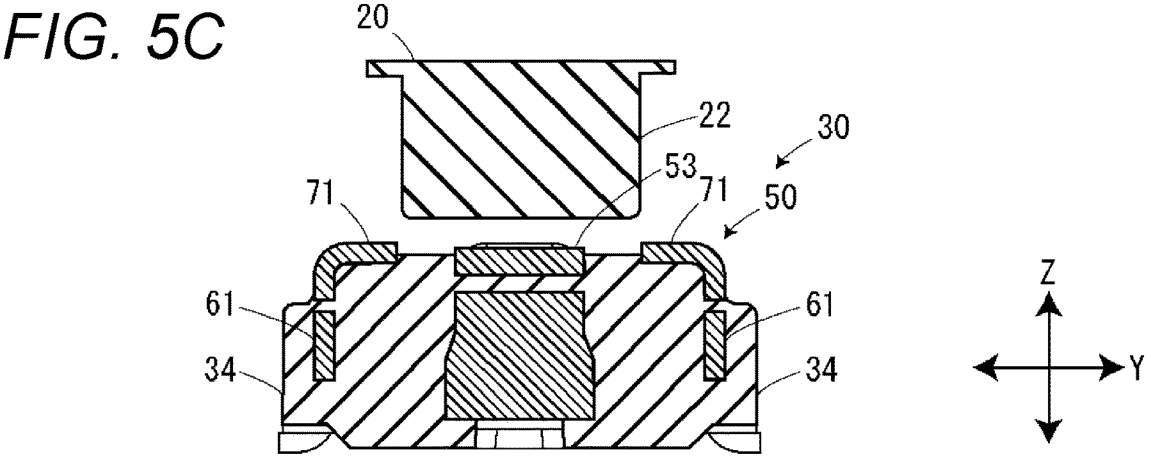
Figure 6A:
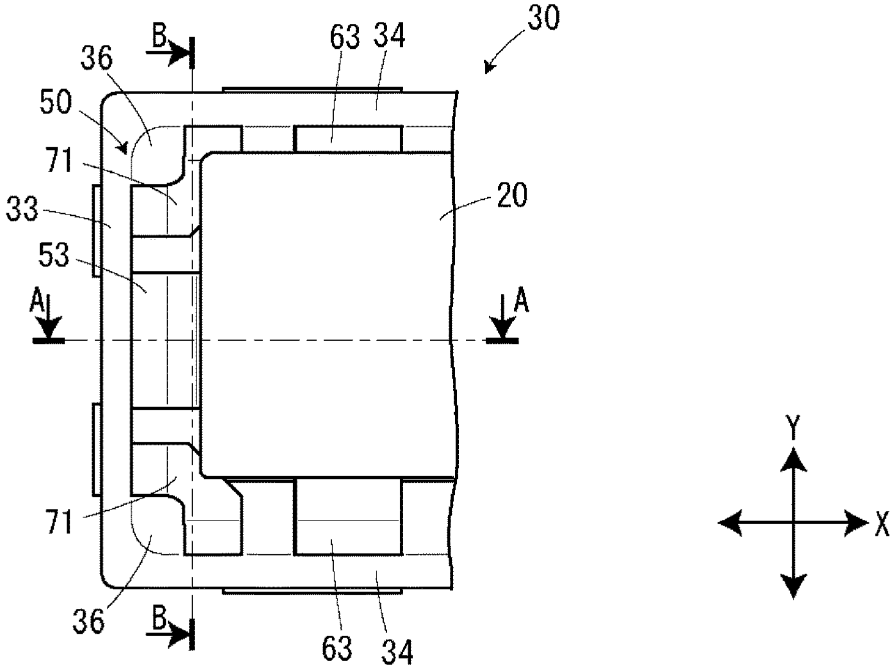
FIGS. 6A to 6C are views for describing an operation (in a displaced state) of fitting the receptacle connector and the plug connector to each other according to the first embodiment.
Figure 6B:
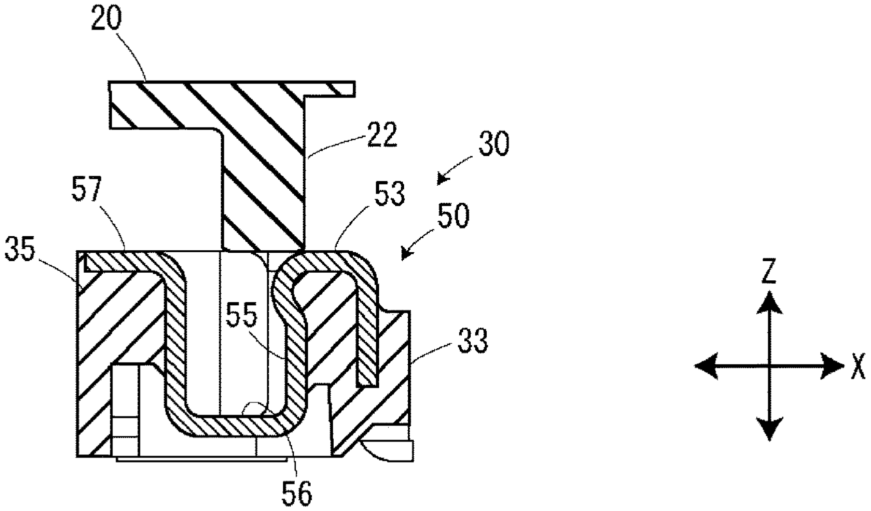
Figure 6C:
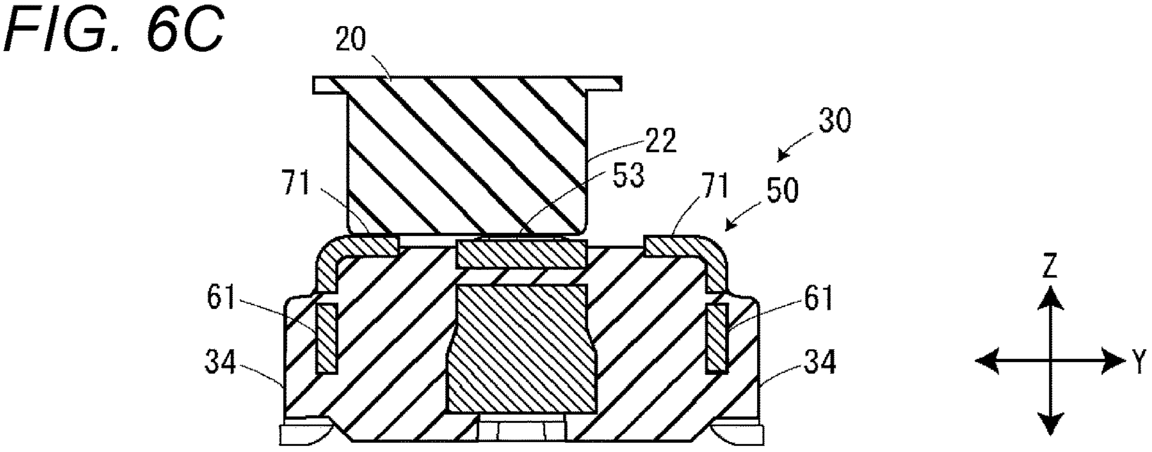

Fitting operation will be described with reference to FIGS. 5A to 5C and FIGS. 6A to 6C. FIGS. 5A to 5C are views for describing an operation of fitting the receptacle connector 30 of the first embodiment and the plug connector 20 which is the partner connector to each other. FIGS. 6A to 6C are views for describing a state in which the positions of the receptacle connector 30 of the first embodiment and the plug connector 20 are displaced from each other in the fitting operation. Note that FIGS. 5A and 6A are top views of the receptacle connector 30. FIGS. 5B and 6B are sectional views of the receptacle connector 30 of FIGS. 5A and 6A along an A-A line. FIGS. 5C and 6C are sectional views of the receptacle connector of FIGS. 5A and 6A along a B-B line. For the sake of convenience in description, the plug connector 20 is schematically shown.

As shown in FIGS. 5A and 5B, in fitting, the plug connector 20 is first positioned above the receptacle connector 30, and the positions thereof are aligned with each other. If the position of the plug connector 20 is accurately aligned with the position of the receptacle connector 30, the fitting portion 22 of the plug connector 20 is positioned immediately above the receiving space 37 of the receptacle connector 30. In this state, the plug connector 20 approaches the receptacle connector 30 from the fitting direction Z, and accordingly, the rectangular annular fitting portion 22 of the plug connector 20 enters the receiving space 37 of the receptacle connector 30 and the island-shaped protruding wall 35 of the receptacle connector 30 enters the fitting portion 22.

At this point, the fitting portion 22 of the plug connector 20 is guided in the longitudinal direction X by the short wall protection portions 53 and the inner plate portions 55, and is guided in the lateral direction Y by the pairs of long wall protection portions 63 and the pairs of leg portions 65 (see FIG. 3A). Accordingly, the fitting portion 22 of the plug connector 20 can be smoothly fitted in the receiving space 37 of the receptacle connector 30. Since the receptacle connector 30 and the plug connector 20 contact with each other, no load in the fitting direction Z acts on the corner protection portions 71 (see FIG. 5C). In this case, although the sections 74 of the pairs of corner protection portions 71 are exposed to the inside of the housing 31, the fitting portion 22 is not chipped away by the sections 74.

On the other hand, in a case where the position of the plug connector 20 is displaced from the position of the receptacle connector 30 as shown in FIGS. 6A and 6B, the position of the receiving space 37 of the receptacle connector 30 and the position of the fitting portion 22 of the plug connector 20 are misaligned with each other. In this state, if the plug connector 20 approaches the receptacle connector 30 from the fitting direction Z, the fitting portion 22 of the plug connector 20 contacts the reinforcement bracket 50 of the receptacle connector 30. At this point, the short walls 33 of the housing 31 are protected by the short wall protection portions 53 of the reinforcement brackets 50, and the long walls 34 of the housing 31 are protected by the long wall protection portions 63 of the reinforcement brackets 50.

As shown in FIG. 6C, each corner portion 36 of the housing 31 between the short wall 33 and the long wall 34 is also protected by a corresponding one of the corner protection portions 71 of the reinforcement brackets 50. As described above, since the resin also enters the clearance between the tip end of the corner protection portion 71 and the upper edge of the side plate portion 61, sinking of the tip end side of the corner protection portion 71 is reduced. In this manner, the strength of the housing 31 against the load in the fitting direction Z is entirely enhanced by the short wall protection portions 53, the long wall protection portions 63, and the corner protection portions 71. Thus, even if the receptacle connector 30 and the plug connector 20 contact each other, damage of the housing 31 of the receptacle connector 30 is reduced.

As described above, according to the first embodiment, the upper surface of the short wall 33 of the housing 31 is covered with the short wall protection portion 53 extending from the outer plate portion 51, and the upper surface of each long wall 34 of the housing 31 is covered with a corresponding one of the long wall protection portions 63 extending from the pair of side plate portions 61. The upper surface of each corner portion 36 of the housing 31 is covered with a corresponding one of the corner protection portions 71 extending from the outer plate portion 51. Thus, even if the pair of connection portions 66 connecting the outer plate portion 51 and the pair of side plate portions 61 to each other is not exposed on the upper surfaces of the corner portions 36 of the housing 31, the corner portions 36 of the housing 31 can be protected by the pair of corner protection portions 71. Even if the connectors contact each other in fitting, the short walls 33, the long walls 34, and the corner portions 36 of the housing 31 are protected from the load in the fitting direction Z, and the robustness of the receptacle connector 30 is enhanced.

Second Embodiment

Figure 7:
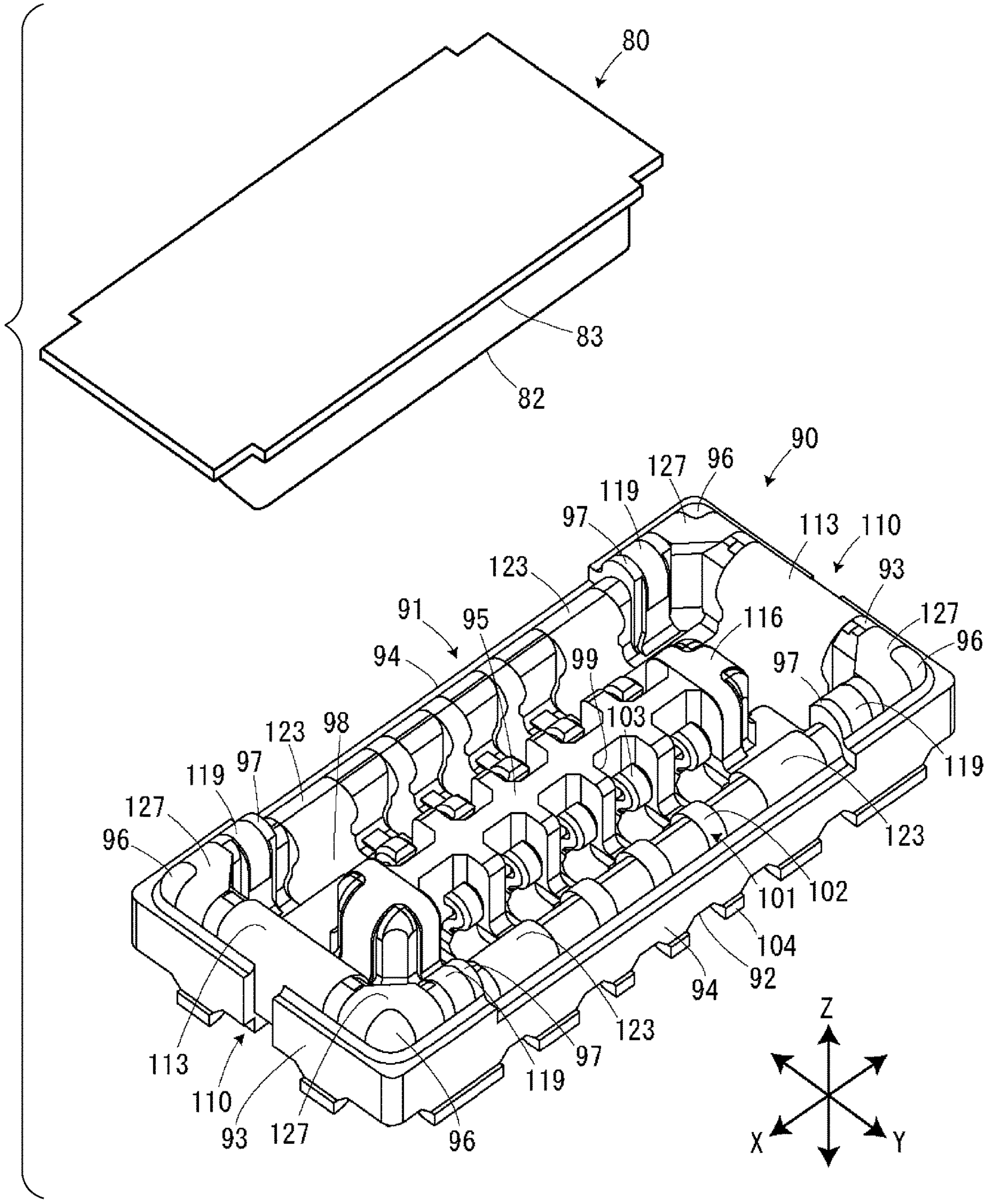
FIG. 7 is a perspective view of a receptacle connector according to a second embodiment.
Figure 8A:
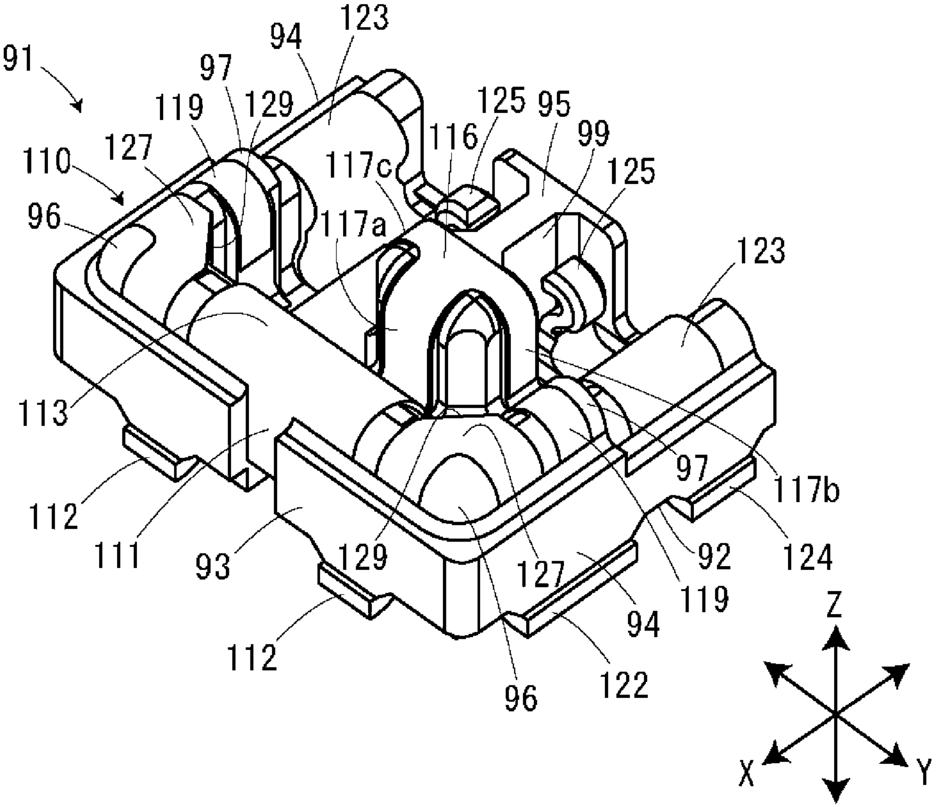
FIGS. 8A and 8B are perspective views of an end portion of the receptacle connector according to the second embodiment.
Figure 8B:
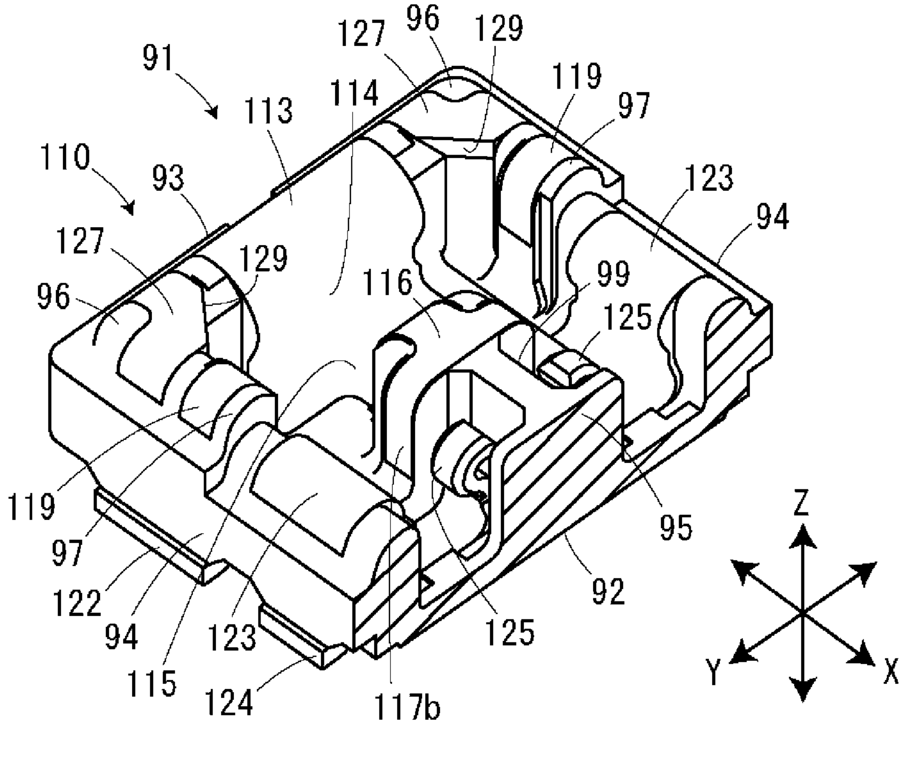
Figure 9A:
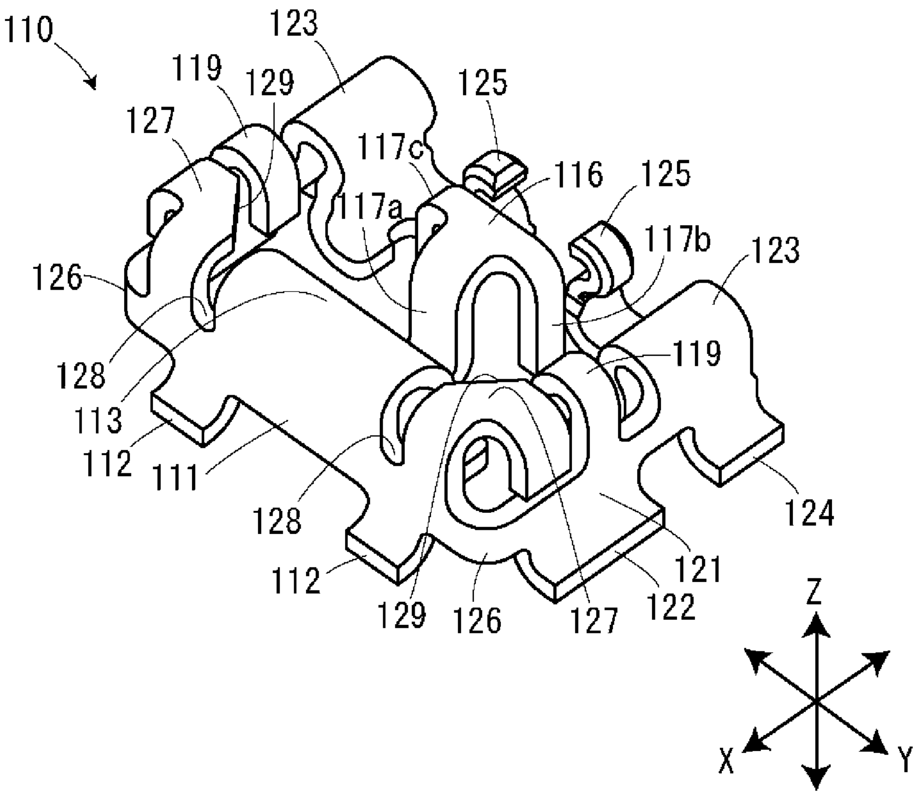
FIGS. 9A and 9B are perspective views of a reinforcement bracket according to the second embodiment.
Figure 9B:
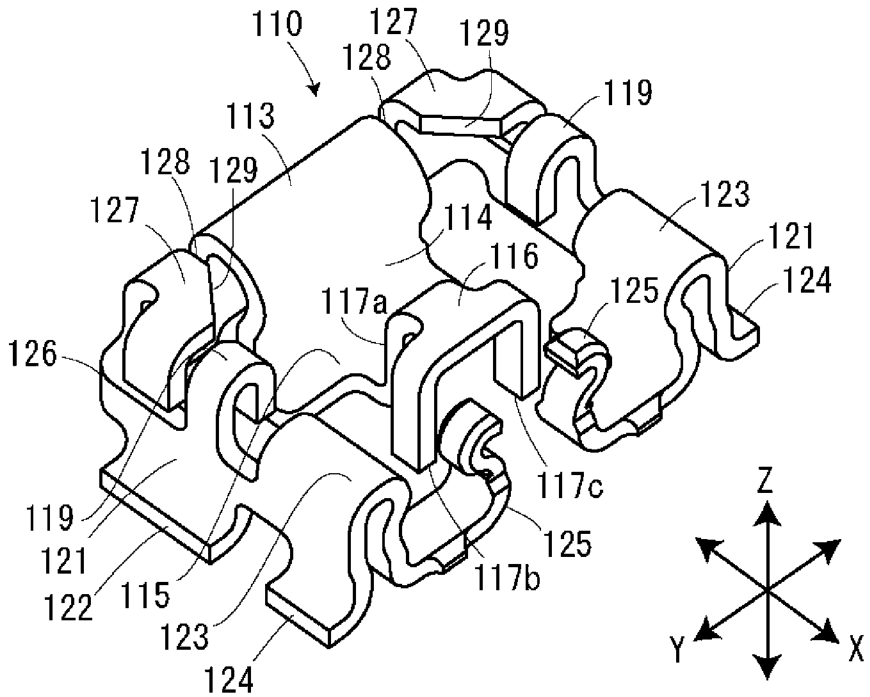

Subsequently, a receptacle connector 90 of a second embodiment will be described. FIG. 7 is a perspective view of the receptacle connector 90 of the second embodiment. FIGS. 8A and 8B are perspective views of an end portion of the receptacle connector 90 of the second embodiment. FIGS. 9A and 9B are perspective views of a reinforcement bracket of the second embodiment. Note that FIG. 8A is the perspective view of the end portion of the receptacle connector 90 from the outside and FIG. 8B is the perspective view of the end portion of the receptacle connector 90 from the inside. FIG. 9A is the perspective view of the reinforcement bracket 110 from the outside, and FIG. 9B is the perspective view of the reinforcement bracket 110 from the inside. For the receptacle connector 90 of the second embodiment, description of configurations similar to those of the receptacle connector 30 of the first embodiment will be omitted in some cases. For the sake of convenience in description, a plug connector 80 is schematically shown.

As shown in FIG. 7, a housing 91 of the second embodiment is configured such that the height of both end portions of each long wall 94 in the longitudinal direction X is one step higher than the height of an intermediate portion. That is, the housing 91 includes upper step portions having a first height at one and the other end portions of each long wall 94 in the longitudinal direction X and a lower step portion having a second height, which is lower than the first height, between one and the other end portions of each long wall 94 in the longitudinal direction X. In description below, the upper step portion of each long wall 94 at the both end portions in the longitudinal direction X will be sometimes referred to as an upper step portion (an upper step side), and the lower step portion of each long wall 94 at the intermediate portion in the longitudinal direction X will be sometimes referred to as a lower step portion (a lower step side).

The reinforcement bracket 110 of the second embodiment includes a pair of long wall protection portions 119 covering the upper step side of the pair of long walls 94 and a pair of terminal portions 123 covering the lower step side of the pair of long walls 94. In this case, since both end sides (the upper step side) of each long wall 94 are one step higher, the pair of terminal portions 123 formed so as to cover the lower step side of the pair of long walls 94 is less likely to function as guides in the lateral direction Y. For this reason, the reinforcement bracket 110 of the second embodiment includes, in addition to the pair of terminal portions 123 covering the lower step side of the pair of long walls 94, the pair of long wall protection portions 119 covering the upper step side of the pair of long walls 94. As shown in FIG. 7 and the like, upper surfaces (shoulder portions 97) of the pair of long walls 94 on the upper step side are covered with the pair of long wall protection portions 119 in the present embodiment. Moreover, each terminal portion 123 is adjacent to a corresponding one of the long wall protection portions 119, and partially covers an upper surface of a corresponding one of the long walls 94 on the lower step side.

In the housing 91, a receiving space 98 that receives a rectangular annular fitting portion 82 of the plug connector 80 by a bottom wall 92, a pair of short walls 93, the pair of long walls 94, and an island-shaped protruding wall 95 is formed.

A plurality of signal terminals 101 is provided in part of the lower step portion (the intermediate portion) of each long wall 94 in the longitudinal direction X. The pair of reinforcement brackets 110 is provided on both end sides (the upper step portions and the lower step portions provided with the pairs of terminal portion 123) of the pair of long walls 94 in the longitudinal direction X. The plurality of signal terminals 101 is provided on the center side of the housing 91 (the intermediate portion) with respect to the pairs of terminal portions 123 of the reinforcement brackets 110 in the lower step portions of the pair of long walls 94.

In order to reduce contact among skirts 83 of the plug connector 80 and the pair of long walls 94 in fitting, the upper surfaces of the pair of long walls 94 are formed in a step shape such that the height of the plurality of signal terminals 101 in the intermediate portion (the lower step portion) in the longitudinal direction X is lower than the height of the reinforcement brackets 110 on both end sides in the longitudinal direction X (i.e., the height of the long wall protection portion 119 covering the upper step portion).

The signal terminal 101 includes a terminal curved portion 102 in the form of a U-shaped plate along an outer surface of the long wall 94, a contact spring 103 extending from one end of the terminal curved portion 102 toward the protruding wall 95, and a terminal mounting portion 104 protruding outward of the long wall 94 from the other end of the terminal curved portion 102. The contact spring 103 is housed with standing in a housing groove 99 which is formed in such a manner that an outer surface of the protruding wall 95 is cut out, and an inner space of the housing groove 99 allows deflection of the contact spring 103 in a plate thickness direction (the lateral direction Y of the housing 91) thereof. The terminal mounting portions 104 are soldered to a mounting surface of a circuit board (not shown), and accordingly, the receptacle connector 90 is electrically connected to a signal processing circuit of the circuit board.

As shown in FIGS. 8A, 8B, 9A, and 9B, an outer plate portion 111 of the reinforcement bracket 110 is provided in the short wall 93 of the housing 91 along an outer surface of the short wall 93, and a short wall protection portion 113 extends from an upper edge of the outer plate portion 111 so as to cover an upper surface of the short wall 93. An inner plate portion 114 extends from the short wall protection portion 113 along an inner surface of the short wall 93, and the short wall protection portion 113 and the inner plate portion 114 form a guide at each end in the longitudinal direction X. A bottom plate portion 115 extends from a lower edge of the inner plate portion 114 along a bottom surface of the bottom wall 92, and a protruding wall protection portion 116 extends from the bottom plate portion 115 so as to cover an end portion of the protruding wall 95. The protruding wall protection portion 116 is branched into a branch portion 117*a*, a branch portion 117*b*, and a branch portion 117*c*, and tip ends of the pair of branch portions 117*b*, 117*c* are embedded in the bottom wall 92 of the housing 91.

A pair of side plate portions 121 of the reinforcement bracket 110 is provided in the pair of long walls 94 of the housing 91 along the outer surfaces of the long walls 94. From upper edges of the pair of side plate portions 121, the pair of long wall protection portions 119 and the pair of terminal portions 123 extend. The pair of long wall protection portions 119 covers the upper surfaces of the pair of long walls 94 on the upper step side, and the pair of terminal portions 123 covers the upper surfaces of the pair of long walls 94 on the lower step side. The long wall protection portion 119 is curved in an inverted U-shape as viewed in section, and the curved shape of the long wall protection portion 119 forms a guide at each end in the lateral direction Y. As described above, even if the upper surfaces of the pair of long walls 94 are formed in the step shape, the pair of long wall protection portions 119 can function as the guides in the lateral direction Y.

The pair of terminal portions 123 extends from the upper edges of the pair of side plate portions 121 toward the protruding wall 95, and a pair of contact springs 125 is formed on the tip end side of the pair of terminal portions 123. The pair of contact springs 125 is housed with standing in the housing grooves 99 which are formed in such a manner that the outer surface of the protruding wall 95 is cut out, and the inner space of the housing groove 99 allows deflection of the contact spring 125 in a plate thickness direction (the lateral direction Y of the housing 91) thereof. A lower edge of the outer plate portion 111 is bent outward to form a pair of outer plate mounting portions 112, and lower edges of the pair of side plate portions 121 are bent outward to form a pair of side plate mounting portions 122 and a pair of terminal mounting portions 124.

A portion of the reinforcement bracket 110 between the short wall protection portion 113 and each outer plate mounting portion 112 is embedded in the short wall 93 of the housing 91. Moreover, each portion of the reinforcement bracket 110 between the long wall protection portion 119 and the side plate mounting portion 122 and each portion of the reinforcement bracket 110 between the terminal portion 123 and the terminal mounting portion 124 are embedded in a corresponding one of the long walls 94 of the housing 91. Thus, in soldering of the pair of outer plate mounting portions 112, the pair of side plate mounting portions 122, and the pair of terminal mounting portions 124, molten solder is held back by the resin short wall 93 and the pair of resin long walls 94, and solder wicking is reduced accordingly. The plug connector 80 is electrically connected to a power circuit of the circuit board (not shown) by soldering, and therefore, the reinforcement brackets 110 reinforce the housing 91. In addition, the reinforcement bracket 110 also functions as a power terminal of the receptacle connector 90.

Both side edges of the outer plate portion 111 and side edges of the pair of side plate portions 121 are coupled to each other through a pair of connection portions 126. A pair of corner protection portions 127 extends from an upper edge of the outer plate portion 111 so as to cover upper surfaces of a pair of corner portions 96 of the housing 91. A tip end of the corner protection portion 127 is separated from an upper edge of an end portion of the side plate portion 121 with a slight clearance formed therebetween, and the resin of the long wall 94 enters to fill such a clearance (specifically see FIG. 10C). Each corner protection portion 127 and the short wall protection portion 113 are separated from each other with a slit 128 formed therebetween, and influence of the shape of the corner protection portion 127 on the shape of the short wall protection portion 113 is reduced. The sections 129 of the pair of corner protection portions 127 are exposed to the inside of the housing 91, and therefore, insert molding is facilitated as in the first embodiment.

Figure 10A:
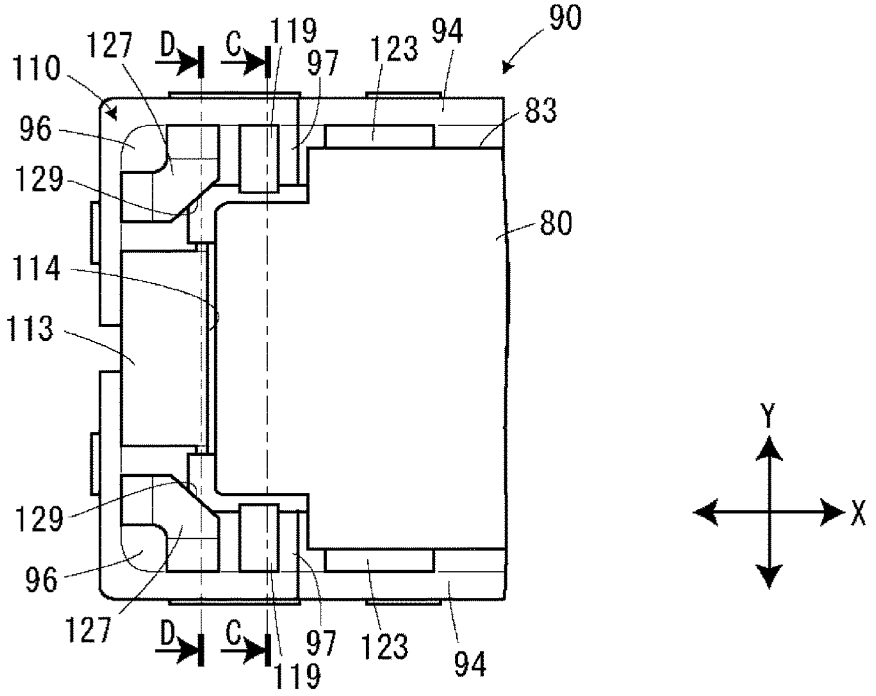
FIGS. 10A to 10C are views for describing an operation of fitting the receptacle connector and a plug connector to each other according to the second embodiment.
Figure 10B:
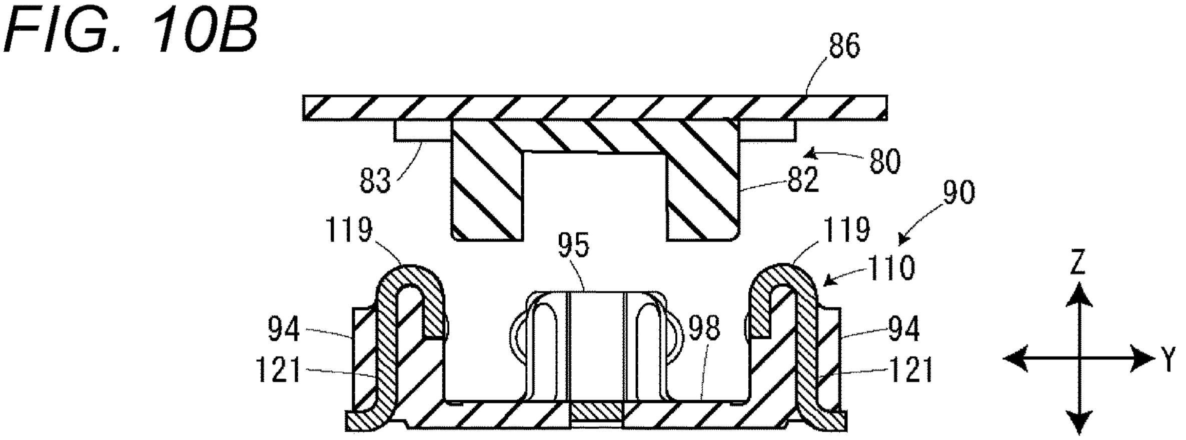
Figure 10C:
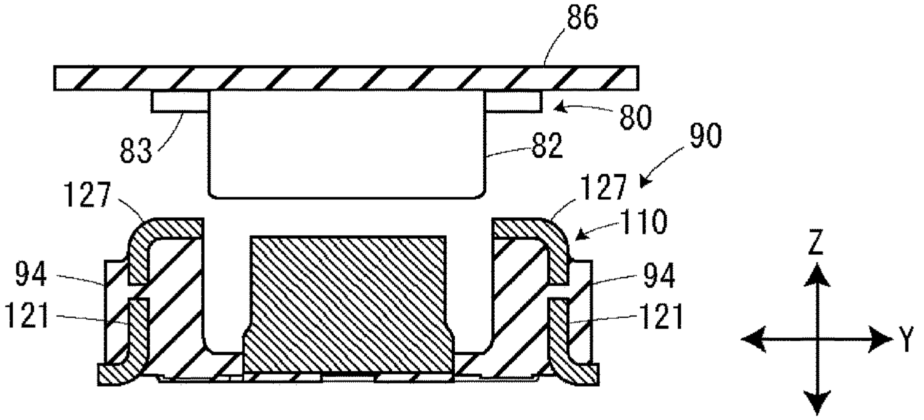
Figure 11A:
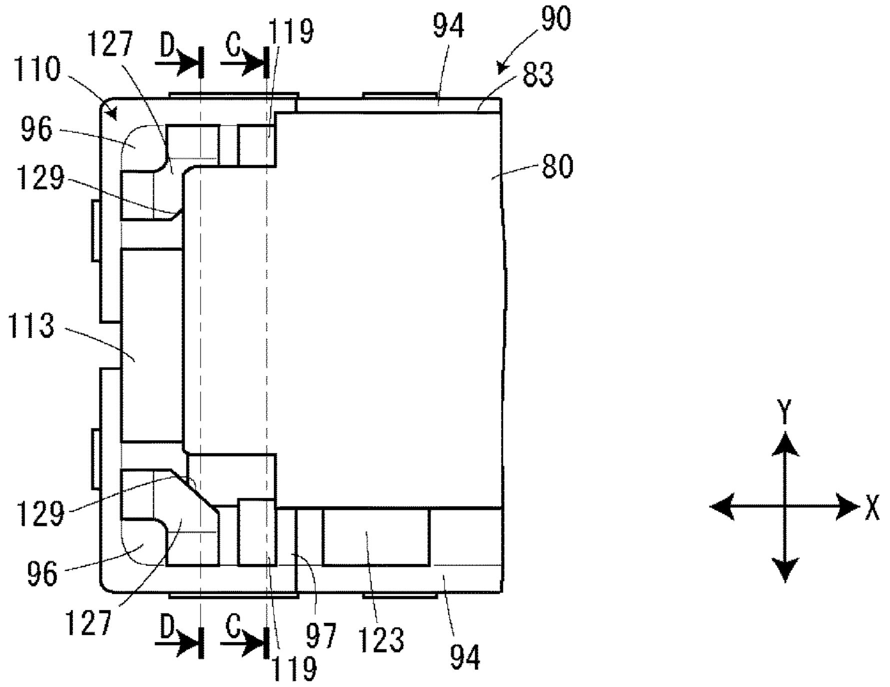
FIGS. 11A to 11C are views for describing an operation (in a displaced state) of fitting the receptacle connector and the plug connector to each other according to the second embodiment.
Figure 11B:
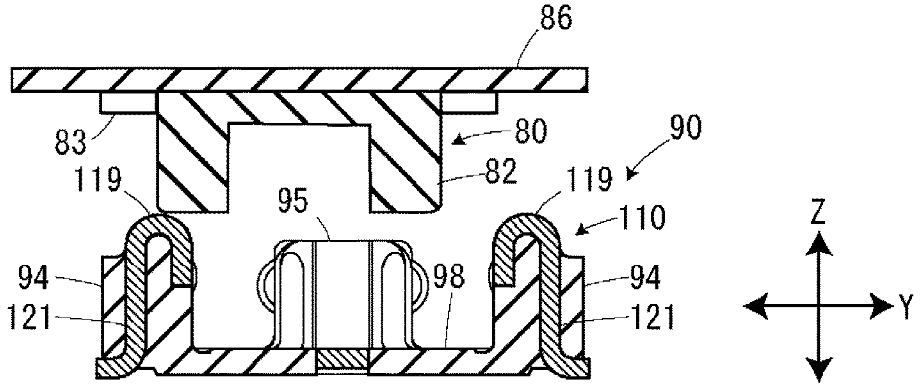
Figure 11C:
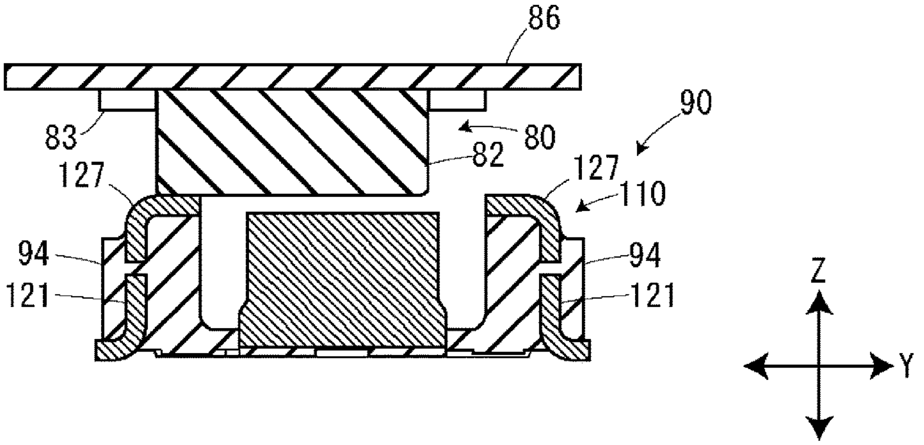

Fitting operation will be described with reference to FIGS. 10A to 10C and FIGS. 11A to 11C. FIGS. 10A to 10C are views for describing an operation of fitting the receptacle connector 90 of the second embodiment and the plug connector 80 to each other. FIGS. 11A to 11C are views for describing a state in which the positions of the receptacle connector 90 of the second embodiment and the plug connector 80 are displaced from each other in the fitting operation. Note that FIGS. 10A and 11A are top views of the receptacle connector 90, FIGS. 10B and 11B are sectional views of the receptacle connector 90 along a C-C line, and FIGS. 10C and 11C are sectional views of the receptacle connector along a D-D line. For the sake of convenience in description, the plug connector 80 is schematically shown.

As shown in FIGS. 10A to 10C, in fitting, the plug connector 80 is first positioned above the receptacle connector 90, and the positions thereof are aligned with each other. The pair of shoulder portions 97 is formed on each end side of the pair of long walls 94 of the receptacle connector 90 in the longitudinal direction X. The shoulder portion 97 is formed one step higher than the upper surface of the long wall 94. The skirts 83 are formed at the plug connector 80 so as to face the long walls 94. Corner portions of the skirts 83 are cut out so as to avoid the pair of shoulder portions 97 of the receptacle connector 90. If the position of the plug connector 80 is accurately aligned with the position of the receptacle connector 90, the fitting portion 82 of the plug connector 80 is positioned immediately above the receiving space 98 of the receptacle connector 90.

In this state, the plug connector 80 approaches the receptacle connector 90 from the fitting direction Z, and accordingly, the rectangular annular fitting portion 82 of the plug connector 80 enters the receiving space 98 of the receptacle connector 90 and the island-shaped protruding wall 95 of the receptacle connector 90 enters the fitting portion 82. At this point, the fitting portion 82 of the plug connector 80 is guided in the longitudinal direction X by the short wall protection portions 113 and the inner plate portions 114, and is guided in the lateral direction Y by the pairs of long wall protection portions 119. Accordingly, the fitting portion 82 of the plug connector 80 can be smoothly fitted in the receiving space 98 of the receptacle connector 90.

The shoulder portions 97 of the receptacle connector 90 contact the circuit board 86 of the plug connector 80 so as to avoid the skirts 83 of the plug connector 80. Since the shoulder portions 97 of the receptacle connector 90 contact the circuit board 86, contact among the long walls 94 of the receptacle connector 90 and the skirts 83 of the plug connector 80 is reduced. That is, a slight clearance is formed between the upper surface of the long wall 94, which is covered with the terminal portion 123, on the lower step side and the skirt 83 of the plug connector 80. Note that the skirts 83 of the plug connector 80 are for reducing the solder wicking.

On the other hand, in a case where the position of the plug connector 80 is displaced from the position of the receptacle connector 90 as shown in FIGS. 11A to 11C, the position of the receiving space 98 of the receptacle connector 90 and the position of the fitting portion 82 of the plug connector 80 are misaligned with each other. In this state, if the plug connector 80 approaches the receptacle connector 90 from the fitting direction Z, the fitting portion 82 of the plug connector 80 contacts the reinforcement bracket 110 of the receptacle connector 90. At this point, the housing 91 of the receptacle connector 90 is protected from contact with the plug connector 80 by the short wall protection portions 113, the long wall protection portions 119, and the corner protection portions 127 of the reinforcement brackets 110.

As described above, according to the second embodiment, the robustness of the receptacle connector 90 can be enhanced even if the connectors contact each other in fitting, as in the first embodiment. Moreover, damage of the skirts 83 of the plug connector 80 by the receptacle connector 90 can be prevented.

Figure 12:
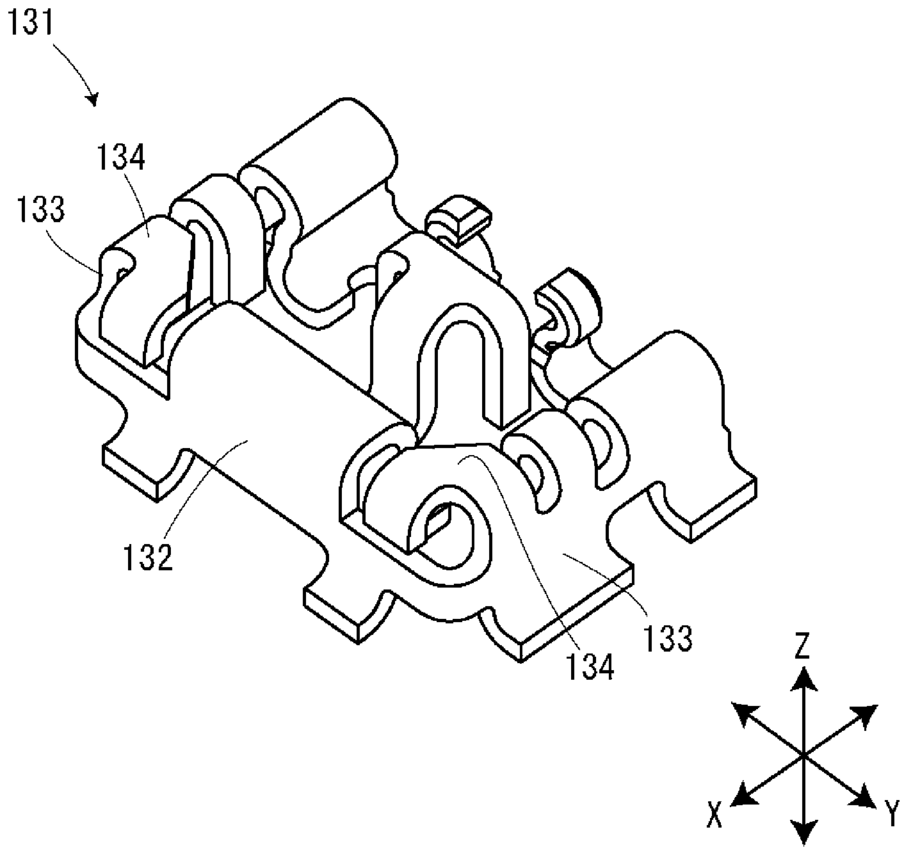
FIG. 12 is a perspective view of a reinforcement bracket according to a variation.

Note that each of the reinforcement brackets 50, 110 of the first and second embodiments is configured such that the pair of corner protection portions 71, 127 extends from the outer plate portion 51, 111, but the pair of corner protection portions 71, 127 may extend from the pair of side plate portions 61, 121. For example, as shown in a variation of FIG. 12, a reinforcement bracket 131 may be configured such that a pair of corner protection portions 134 extends from a pair of side plate portions 133 toward an outer plate portion 132. With this configuration, the robustness of a receptacle connector in fitting can also be enhanced.

In the first and second embodiments, the pair of corner protection portions extends from the upper edge of the end portion of the outer plate portion toward the upper edges of the end portions of the pair of side plate portions, but may only be required to extend from the outer plate portion or the pair of side plate portions so as to cover the pair of corner portions of the housing.

In the first and second embodiments, the slit is formed between the outer plate portion and each corner protection portion, but is not necessarily formed between the outer plate portion and each corner protection portion.

In the first and second embodiments, the reinforcement bracket includes the bottom plate portion and the protruding wall protection portion, but in, e.g., a case where the protruding wall has a sufficient strength, does not necessarily include the bottom plate portion and the protruding wall protection portion.

In the first and second embodiments, the sections of the pair of corner protection portions are exposed to the inside of the housing, but may be embedded in the housing.

In the first and second embodiments, the outer plate portion is along the outer surface of the short wall, but may only be required to be along the outer surface of the short wall at an optional position in a thickness direction of the short wall in the short wall. Similarly, the side plate portion is along the outer surface of the long wall, but may only be required to be along the outer surface of the long wall at an optional position in a thickness direction of the long wall in the long wall.

As described above, the electric connector (the receptacle connector 30, 90) of the present embodiment is an electric connector including a housing (31, 91) configured such that a plurality of signal terminals (41, 101) is arrayed and having a rectangular shape as viewed in plane and a pair of reinforcement brackets (50, 110) that reinforces both end sides of the housing in a longitudinal direction. The housing has a bottom wall (32, 92) having a rectangular shape as viewed in plane, a pair of short walls (33, 93) standing on both ends of the bottom wall in the longitudinal direction, a pair of long walls (34, 94) standing on both ends of the bottom wall in a lateral direction, and an island-shaped protruding wall (35, 95) surrounded by the pair of short walls and the pair of long walls. Each reinforcement bracket has an outer plate portion (51, 111) along an outer surface of a corresponding one of the short walls, a short wall protection portion (53, 113) extending from the outer plate portion so as to cover an upper surface of the corresponding one of the short walls, a pair of side plate portions (61, 121) along outer surfaces of the pair of long walls, a pair of long wall protection portions (63, 119) extending from the pair of side plate portions so as to cover upper surfaces of the pair of long walls, and a pair of connection portions (66, 126) connecting both side edges of the outer plate portion to side edges of the pair of side plate portions. Each corner protection portion (71, 127) extends from either one of the outer plate portion or a corresponding one of the side plate portions, and covers an upper surface of a corresponding one of corner portions (36, 96) each of which is formed between a corresponding pair of short and long walls. According to this configuration, the upper surface of the short wall of the housing is covered with the short wall protection portion extending from the outer plate portion, and the upper surface of each long wall of the housing is covered with a corresponding one of the long wall protection portions extending from the pair of side plate portions. The upper surface of each corner portion of the housing is covered with a corresponding one of the corner protection portions extending from either one of the outer plate portion or the pair of side plate portions. Thus, even if the pair of connection portions connecting the outer plate portion and the pair of side plate portions to each other is not exposed on the upper surfaces of the corner portions of the housing, the corner portions of the housing can be protected by the pair of corner protection portions. Even if connectors contact each other in fitting, the short walls, the long walls, and the corner portions of the housing are protected from a load in a fitting direction and the robustness of the electric connector is enhanced.

In the electric connector of the present embodiment, the pair of corner protection portions extends from the outer plate portion so as to cover the upper surfaces of the corner portions, and a slit (73, 128) is formed between the short wall protection portion and each corner protection portion. According to this configuration, since each corner protection portion and the short wall protection portion are separated from each other with the slit formed therebetween, the shape of the short wall protection portion is not influenced by the shape of the corner protection portion.

In the electric connector of the present embodiment, the pair of corner protection portions extends from one of the outer plate portion or the pair of side plate portions to the other one of the outer plate portion or the pair of side plate portions, and tip ends of the pair of corner protection portions are embedded in the housing. According to this configuration, since the tip ends of the pair of corner protection portions are embedded in the housing, a strength against the load in the fitting direction is enhanced and sinking of the pair of corner protection portions is reduced. Accordingly, the corner portions of the housing are favorably protected.

In the electric connector of the present embodiment, the sections (74, 129) of the pair of corner protection portions are exposed to the inside of the housing. According to this configuration, the sections of the pair of corner protection portions do not need to be covered with resin, and therefore, insert molding can be facilitated.

In the electric connector of the present embodiment, each reinforcement bracket further has an inner plate portion (55, 114) extending from the short wall protection portion along an inner surface of the corresponding one of the short walls, a bottom plate portion (56, 115) extending from the inner plate portion along a bottom surface of the bottom wall, and a protruding wall protection portion (57, 116) extending from the bottom plate portion so as to cover the protruding wall. According to this configuration, the short wall protection portion and the inner plate portion can form a guide in the longitudinal direction in fitting of a partner electric connector. Moreover, the protruding wall of the housing can be protected by the protruding wall protection portion.

In the electric connector of the present embodiment, the outer plate portion includes an outer plate mounting portion (52, 112) to be fixed to a mounting surface, and each side plate portion includes a side plate mounting portion (62, 122) to be fixed to the mounting surface. A portion between the short wall protection portion and the outer plate mounting portion is embedded in the short wall, and each portion between the long wall protection portion and the side plate mounting portion is embedded in the long wall. According to this configuration, when the outer plate mounting portion and the pair of side plate mounting portions are fixed to the mounting surface by soldering, so-called solder wicking causing an upward solder flow along a surface of each mounting portion is reduced by the short wall and the pair of long walls.

In the electric connector of the present embodiment, each reinforcement bracket further includes a pair of leg portions (65) extending from the pair of long wall protection portions along inner surfaces of the pair of long walls. According to this configuration, the pair of long wall protection portions and the pair of leg portions form guides in a lateral direction in fitting of the partner electric connector.

In the electric connector of the present embodiment, each reinforcement bracket further includes a pair of terminal portions (123) extending from the pair of side plate portions toward the protruding wall. According to this configuration, the reinforcement bracket can function as a terminal.

In the electric connector of the present embodiment, the plurality of signal terminals is provided in an intermediate portion of each long wall in the longitudinal direction, and the upper surface of each long wall is formed in a step shape such that the height of the plurality of signal terminals is lower than the height of the reinforcement bracket. According to this configuration, the upper surfaces of the pair of long walls on the upper step side contact the mounting surface to which the partner electric connector is fixed, and contact among the upper surfaces of the pair of long walls on the lower step side and skirts of the partner electric connector is reduced.

In the electric connector of the present embodiment, the pair of long wall protection portions covers the upper surfaces (shoulder portions 97) of the pair of long walls on the upper step side, and the pair of terminal portions covers the upper surfaces of the pair of long walls on the lower step side. According to this configuration, even if the upper surface of each long wall is formed in the step shape, the pair of long wall protection portions can function as guides in the lateral direction.

Note that the present embodiments have been described above, but combinations of some or all of the above-described embodiments and the variations may be employed as other embodiments.

The technique of the present disclosure is not limited to the above-described embodiments, and various changes, replacements, and modifications may be made without departing from the concept of the technical idea. If the technical idea can be implemented by another method using another technique developed or derived from the technique, the technique of the present disclosure may be implemented by such a method. Thus, the claims cover all embodiments assumed to be included in the scope of the technical idea.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electric connector comprising:

a housing configured such that a plurality of signal terminals is arrayed and having a rectangular shape as viewed in plane; and a pair of reinforcement brackets that reinforces both end sides of the housing in a longitudinal direction, wherein the housing has a bottom wall having a rectangular shape as viewed in plane, a pair of short walls standing on both ends of the bottom wall in the longitudinal direction, a pair of long walls standing on both ends of the bottom wall in a lateral direction, an island-shaped protruding wall surrounded by the pair of short walls and the pair of long walls, and pairs of corner portions each of which is formed between a corresponding pair of short and long walls, each reinforcement bracket has an outer plate portion along an outer surface of a corresponding one of the short walls, a short wall protection portion extending from the outer plate portion so as to cover an upper surface of the corresponding one of the short walls, a pair of side plate portions along outer surfaces of the pair of long walls, a pair of long wall protection portions extending from the pair of side plate portions so as to cover upper surfaces of the pair of long walls, a pair of connection portions connecting both side edges of the outer plate portion to side edges of the pair of side plate portions, and a pair of corner protection portions, and each corner protection portion extends from either one of the outer plate portion or a corresponding one of the side plate portions, and is formed so as to cover an upper surface of a corresponding one of the corner portions.

2. The electric connector according to claim 1, wherein the pair of corner protection portions extends from the outer plate portion so as to cover the upper surfaces of the corner portions, and a slit is formed between the short wall protection portion and each corner protection portion.

3. The electric connector according to claim 1, wherein the pair of corner protection portions extends from one of the outer plate portion or the pair of side plate portions to the other one of the outer plate portion or the pair of side plate portions, and tip ends of the pair of corner protection portions are embedded in the housing.

4. The electric connector according to claim 1, wherein sections of the pair of corner protection portions covering the upper surfaces of the pair of corner portions are exposed to an inside of the housing.

5. The electric connector according to claim 1, wherein each reinforcement bracket further has an inner plate portion extending from the short wall protection portion along an inner surface of the corresponding one of the short walls, a bottom plate portion extending from the inner plate portion along a bottom surface of the bottom wall, and a protruding wall protection portion extending from the bottom plate portion so as to cover the protruding wall.

6. The electric connector according to claim 1, wherein the outer plate portion includes an outer plate mounting portion to be fixed to a mounting surface, and each side plate portion includes a side plate mounting portion to be fixed to the mounting surface, and a portion of each reinforcement bracket between the short wall protection portion and the outer plate mounting portion is embedded in the corresponding one of the short walls of the housing, and each portion of each reinforcement bracket between the pair of long wall protection portion and the pair of side plate mounting portion is embedded in a corresponding one of the long walls of the housing.

7. The electric connector according to claim 1, wherein each reinforcement bracket further includes a pair of leg portions extending from the pair of long wall protection portions along inner surfaces of the pair of long walls.

8. The electric connector according to claim 1, wherein each reinforcement bracket further includes a pair of terminal portions extending from the pair of side plate portions toward the protruding wall.

9. The electric connector according to claim 8, wherein each long wall includes an upper step portion having a first height and a lower step portion having a second height lower than the first height, each long wall protection portion covers an upper surface of the upper step portion, and the plurality of signal terminals is provided in the lower step portion.

10. The electric connector according to claim 9, wherein each terminal portion partially covers an upper surface of the lower step portion.

* * * * *